(12) United States Patent
Baykaner et al.

(10) Patent No.: US 11,611,445 B2
(45) Date of Patent: Mar. 21, 2023

(54) CHANGING SMART CONTRACTS RECORDED IN BLOCK CHAINS

(71) Applicant: Nokia Technologies Oy, Espoo (FI)

(72) Inventors: Khan Baykaner, Upper Cambourne (GB); Alberto Ramos, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 423 days.

(21) Appl. No.: 16/486,458

(22) PCT Filed: Feb. 17, 2017

(86) PCT No.: PCT/EP2017/053682
§ 371 (c)(1),
(2) Date: Aug. 15, 2019

(87) PCT Pub. No.: WO2018/149504
PCT Pub. Date: Aug. 23, 2018

(65) Prior Publication Data
US 2020/0235947 A1     Jul. 23, 2020

(51) Int. Cl.
*G06Q 20/02*     (2012.01)
*H04L 9/00*     (2022.01)
(Continued)

(52) U.S. Cl.
CPC .......... *H04L 9/3297* (2013.01); *G06Q 20/02* (2013.01); *G06Q 40/10* (2013.01); *H04L 9/0816* (2013.01);
(Continued)

(58) Field of Classification Search
CPC ........ G06Q 20/02; G06Q 20/00; G06Q 40/00; G06Q 2220/00; H04L 9/3297;
(Continued)

(56) References Cited

U.S. PATENT DOCUMENTS

| 6,012,094 A | 1/2000 | Leymann et al. |
| 6,687,698 B1 | 2/2004 | Nixon et al. |
| (Continued) | | |

FOREIGN PATENT DOCUMENTS

| CN | 105893042 A | 8/2016 |
| CN | 106327191 A | 1/2017 |
| WO | 2018/149505 A1 | 8/2018 |

OTHER PUBLICATIONS

"Smart Contracts are Immutable—That's Amazing", downloaded from https://tjayrush.medium.com/smart-contracts-are-immutable-thats-amazing-and-it-sucks-e0fbc7b0ec16 2016, dated 2016 and attached as PDF file). (Year: 2016).*

(Continued)

*Primary Examiner* — James D Nigh
(74) *Attorney, Agent, or Firm* — Joseph C. Drish; Harrington & Smith

(57) ABSTRACT

A technique, comprising: identifying, at a node forming part of a group of nodes operating a distributed ledger comprising a block chain, a decision to retrospectively change a first smart contract prescribing one or more changes in the ledger already recorded in one or more existing blocks of the blockchain; and, without changing any existing blocks of the blockchain, updating the ledger by adding to the current end of the blockchain a new block indicating a new state of the ledger determined by a re-execution of all operations, according to the first smart contract and one or more other smart contracts, recorded in one or more blocks of the blockchain after a block recording an operation of the first smart contract, while taking into account the change to the first smart contract.

18 Claims, 3 Drawing Sheets

(51) Int. Cl.
   *H04L 9/32* (2006.01)
   *G06Q 40/00* (2012.01)
   *H04L 9/08* (2006.01)
   *G06Q 40/10* (2023.01)
   *G06Q 20/00* (2012.01)

(52) U.S. Cl.
   CPC ....... *H04L 9/3236* (2013.01); *G06Q 2220/00* (2013.01); *H04L 9/50* (2022.05); *H04L 2209/56* (2013.01)

(58) Field of Classification Search
   CPC ....... H04L 9/0816; H04L 9/3236; H04L 9/50; H04L 2209/00
   USPC ..................................................... 705/50–79
   See application file for complete search history.

(56) References Cited

U.S. PATENT DOCUMENTS

| | | | |
|---|---|---|---|
| 8,903,779 | B1 | 12/2014 | Holenstein et al. |
| 2002/0049738 | A1 | 4/2002 | Epstein |
| 2003/0046298 | A1 | 3/2003 | Weedon |
| 2003/0163431 | A1 | 8/2003 | Ginter et al. |
| 2013/0246845 | A1 | 9/2013 | Parkinson |
| 2016/0203139 | A1 | 7/2016 | Monsch et al. |
| 2016/0275059 | A1* | 9/2016 | Taparia ................. G06F 40/169 |
| 2016/0335533 | A1 | 11/2016 | Davis et al. |
| 2017/0005804 | A1 | 1/2017 | Zinder |
| 2017/0046652 | A1* | 2/2017 | Haldenby ............ G06Q 20/065 |
| 2017/0300872 | A1* | 10/2017 | Brown ................. G06Q 20/382 |
| 2017/0323392 | A1* | 11/2017 | Kasper ................. H04L 63/123 |
| 2018/0005186 | A1* | 1/2018 | Hunn ..................... G06F 16/93 |
| 2018/0041345 | A1* | 2/2018 | Maim ...................... H04L 9/32 |
| 2018/0088928 | A1* | 3/2018 | Smith .................. H04L 9/3239 |
| 2018/0096360 | A1* | 4/2018 | Christidis ............. G06Q 20/02 |
| 2018/0101560 | A1* | 4/2018 | Christidis ............. H04L 9/3236 |
| 2018/0181309 | A1* | 6/2018 | Miyamae ............ H04L 67/1095 |
| 2018/0189312 | A1* | 7/2018 | Alas ..................... H04L 9/3239 |

OTHER PUBLICATIONS

"Adding Concurrency to Smart Contracts", downloaded from 1702.04467.pdf (arxiv.org), dated 2017, attached as PDF file. (Year: 2017).*

Dickerson et al. "Adding Concurrency to Smart Contracts", arXiv:1702.04467v1, Feb. 15, 2017, 18 pages (Year: 2017).*

Office action received for corresponding European Patent Application No. 17706440.9, dated Feb. 9, 2021, 6 pages.

"Transactions", Oracle, Retrieved on Jul. 11, 2019, Webpage available at : https://docs.oracle.com/cd/E11882_01/server.112/e40540/transact.htm#CNCPT016.

International Search Report and Written Opinion received for corresponding Patent Cooperation Treaty Application No. PCT/EP2017/053682, dated Oct. 12, 2017, 11 pages.

Silverberg et al., "Getting Smart: Contracts on the Blockchain", IIF, May 11, 2016, 225 pages.

"Smart Contracts on Bitcoin Blockchain", BitFury Group, Sep. 4, 2015, pp. 1-20.

Antonopoulos, "Mastering Bitcoin—Unlocking Digital Cryptocurrencies", O'Reilly, 2015, 298 pages.

* cited by examiner

CHANGING SMART CONTRACTS RECORDED IN BLOCK CHAINS

RELATED APPLICATION

This application was originally filed as Patent Cooperation Treaty Application No. PCT/EP2017/053682 filed Feb. 17, 2017.

Blockchain technology is of increasing interest in a variety of different fields, because it facilitates the distribution of an electronic ledger across a plurality of nodes, with a high degree of resistance against dishonest tampering of the ledger. An electronic ledger based on blockchain technology records changes in the ledger in the form of a chain of blocks, each block linked to the preceding block in the chain, such that an attempt to change one block in the chain would necessitate a change to the next block in the chain, and so on. Accordingly, any attempt to change one block of the chain would necessitate changes to all subsequent blocks in the chain. In one form of blockchain technology, one way functions are used to create links between blocks that significantly increase the computing time that would be needed to recreate a block having the necessary link to the earlier block.

The inventors for the present application have identified the problem of making changes, such as corrections, to a smart contract recorded in a ledger blockchain, without detracting from the desirable property of the blockchain to provide an effectively immutable record of all changes in the ledger.

There is hereby provided a method, comprising: identifying, at a node forming part of a group of nodes operating a distributed ledger comprising a blockchain, a decision to retrospectively change a first smart contract prescribing one or more changes in the ledger already recorded in one or more existing blocks of the blockchain; and, without changing any existing blocks of the blockchain, updating the ledger by adding to the current end of the blockchain a new block indicating a new state of the ledger determined by a re-execution of all operations, according to the first smart contract and one or more other smart contracts, recorded in one or more blocks of the blockchain after a block recording an operation of the first smart contract, while taking into account the change to the first smart contract.

According to one embodiment, the method further comprises including in said new block a reference to said decision to change said first smart contract.

According to one embodiment, said group of nodes operating said distributed ledger comprise at least two classes of node: a first class of node provided with one or more cryptographic key pairs for voting on decisions to change a smart contract recorded in the blockchain; and a second class of node without one or more cryptographic key pairs for voting on decisions to change a smart contract recorded in the blockchain.

According to one embodiment, said updating the ledger is dependent on the node identifying, using said cryptographic key pairs, that said decision to change said first smart contract is supported by at least a predetermined threshold number of said first class of nodes.

According to one embodiment, the method further comprises: in the event of a split in the block chain, giving priority to extending the chain of blocks including the highest number of smart contract changes supported by said at least a predetermined threshold number of said first class nodes.

According to one embodiment, said blockchain records a smart contract according to which one or more of said nodes are configured to remove a node from said first class of nodes, in response to one or more predetermined conditions being met.

According to one embodiment, said one or more predetermined conditions include support by a predetermined number of said nodes.

According to one embodiment, said distributed ledger records payment of taxes.

There is also hereby provided an apparatus comprising: a processor and memory including computer program code, wherein the memory and computer program code are configured to, with the processor, cause the apparatus to: identify, at a node forming part of a group of nodes operating a distributed ledger comprising a blockchain, a decision to retrospectively change a first smart contract prescribing one or more changes in the ledger already recorded in one or more existing blocks of the blockchain; and, without changing any existing blocks of the blockchain, update the ledger by adding to the current end of the blockchain a new block indicating a new state of the ledger determined by a re-execution of all operations, according to the first smart contract and one or more other smart contracts, recorded in one or more blocks of the blockchain after a block recording an operation of the first smart contract, while taking into account the change to the first smart contract.

According to one embodiment, the memory and computer program code are further configured to, with the processor, cause the apparatus to: include in said new block a reference to said decision to change said first smart contract.

According to one embodiment, said group of nodes operating said distributed ledger comprise at least two classes of node: a first class of node provided with one or more cryptographic key pairs for voting on decisions to change a smart contract recorded in the blockchain; and a second class of node without one or more cryptographic key pairs for voting on decisions to change a smart contract recorded in the blockchain.

According to one embodiment, the memory and computer program code are further configured to, with the processor, cause the apparatus to: update the ledger dependent on identifying, using said cryptographic key pairs, that said decision to change said first smart contract is supported by at least a predetermined threshold number of said first class of nodes.

According to one embodiment, the memory and computer program code are further configured to, with the processor, cause the apparatus to: in the event of a split in the block chain, give priority to extending the chain of blocks including the highest number of smart contract changes supported by said at least a predetermined threshold number of said first class nodes.

According to one embodiment, said blockchain records a smart contract according to which one or more of said nodes are configured to remove a node from said first class of nodes, in response to one or more predetermined conditions being met.

According to one embodiment, said one or more predetermined conditions include support by a predetermined number of said nodes.

According to one embodiment, said distributed ledger records payment of taxes.

There is also hereby provided an apparatus, comprising: means for identifying, at a node forming part of a group of nodes operating a distributed ledger comprising a blockchain, a decision to retrospectively change a first smart contract prescribing one or more changes in the ledger already recorded in one or more existing blocks of the blockchain; and means for, without changing any existing blocks of the blockchain, updating the ledger by adding to the current end of the blockchain a new block indicating a new state of the ledger determined by a re-execution of all operations, according to the first smart contract and one or more other smart contracts, recorded in one or more blocks of the blockchain after a block recording an operation of the first smart contract, while taking into account the change to the first smart contract.

There is also hereby provided a computer program product comprising program code means which when loaded into a computer controls the computer to: identify, at a node forming part of a group of nodes operating a distributed ledger comprising a blockchain, a decision to retrospectively change a first smart contract prescribing one or more changes in the ledger already recorded in one or more existing blocks of the blockchain; and, without changing any existing blocks of the blockchain, update the ledger by adding to the current end of the blockchain a new block indicating a new state of the ledger determined by a re-execution of all operations, according to the first smart contract and one or more other smart contracts, recorded in one or more blocks of the blockchain after a block recording an operation of the first smart contract, while taking into account the change to the first smart contract.

Embodiments of the invention are described in detail hereunder, by way of example only, with reference to the accompanying drawings, in which:

FIG. 1 illustrates a group of interconnected nodes 2 operating a distributed ledger.

Figure 1:
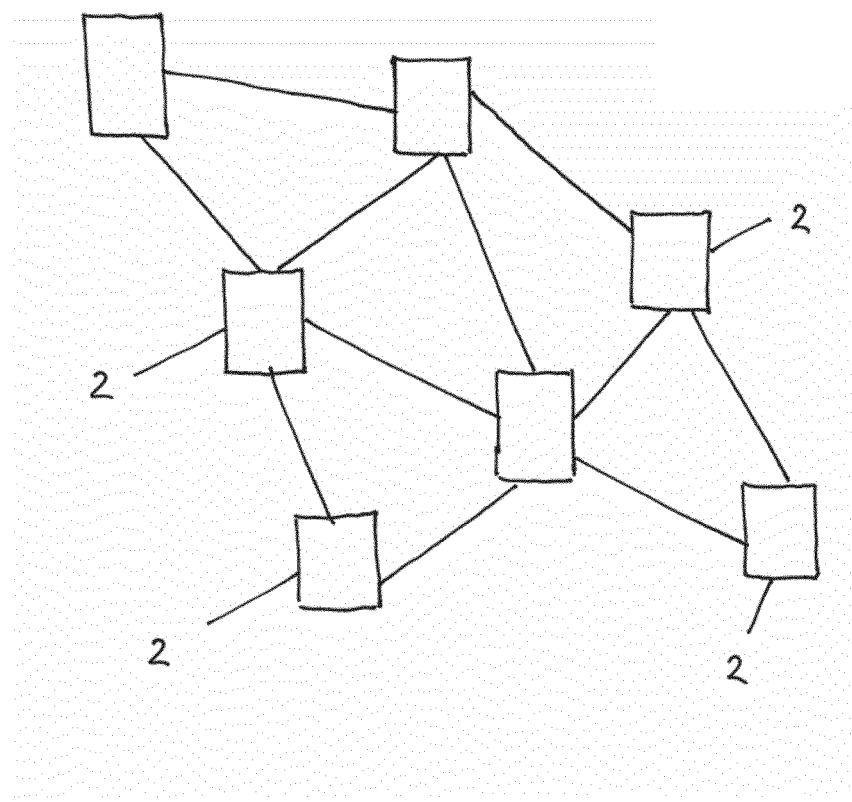
FIG. 1 illustrates a group of interconnected nodes operating a distributed ledger.
Figure 2:
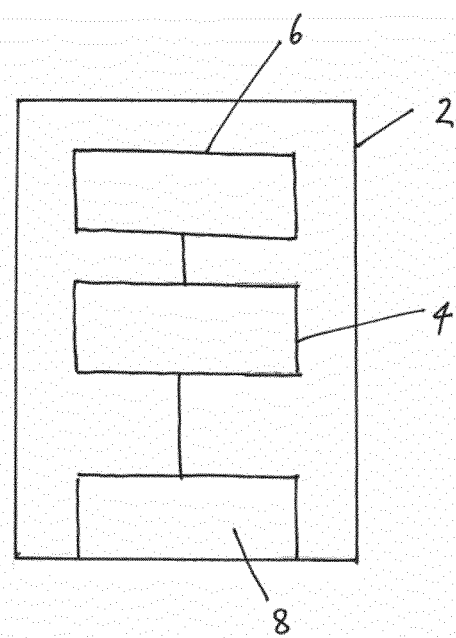
FIG. 2 illustrates one example of an apparatus for use at each node of FIG. 1.

FIG. 2 shows an example of apparatus for use at each node 2 of FIG. 1.-A processor 4 operates in accordance with program code stored at memory 6. Both the processor 4 and the memory 6 may be implemented as one or more chips. The memory 6 may include read-only memory, volatile memory, non-volatile memory and random-access memory. The above elements may be provided on one or more circuit boards. The apparatus also comprises an interface 8 for transferring data to and from one or more other nodes 2 of the distributed ledger network. It should be appreciated that the apparatus shown in FIG. 2 described above may comprise further elements which are not directly involved with the embodiments of the invention described hereafter.

All operations described below that are carried out by the processor 4 follow program code stored at memory 6. In one embodiment, all operations carried out by the processor 4 follow code of one or more smart contracts recorded in one or more blocks of a distributed block chain, of which a copy is stored locally at memory 6. The code of each smart contract prescribes or dictates actions by one or more nodes of the group in response to one or more events.

An embodiment of the present invention is described in detail below for the example of a blockchain used to record payment of taxes by a plurality of users, but the same technique is equally applicable to blockchains used for any other purpose.

Figure 3:
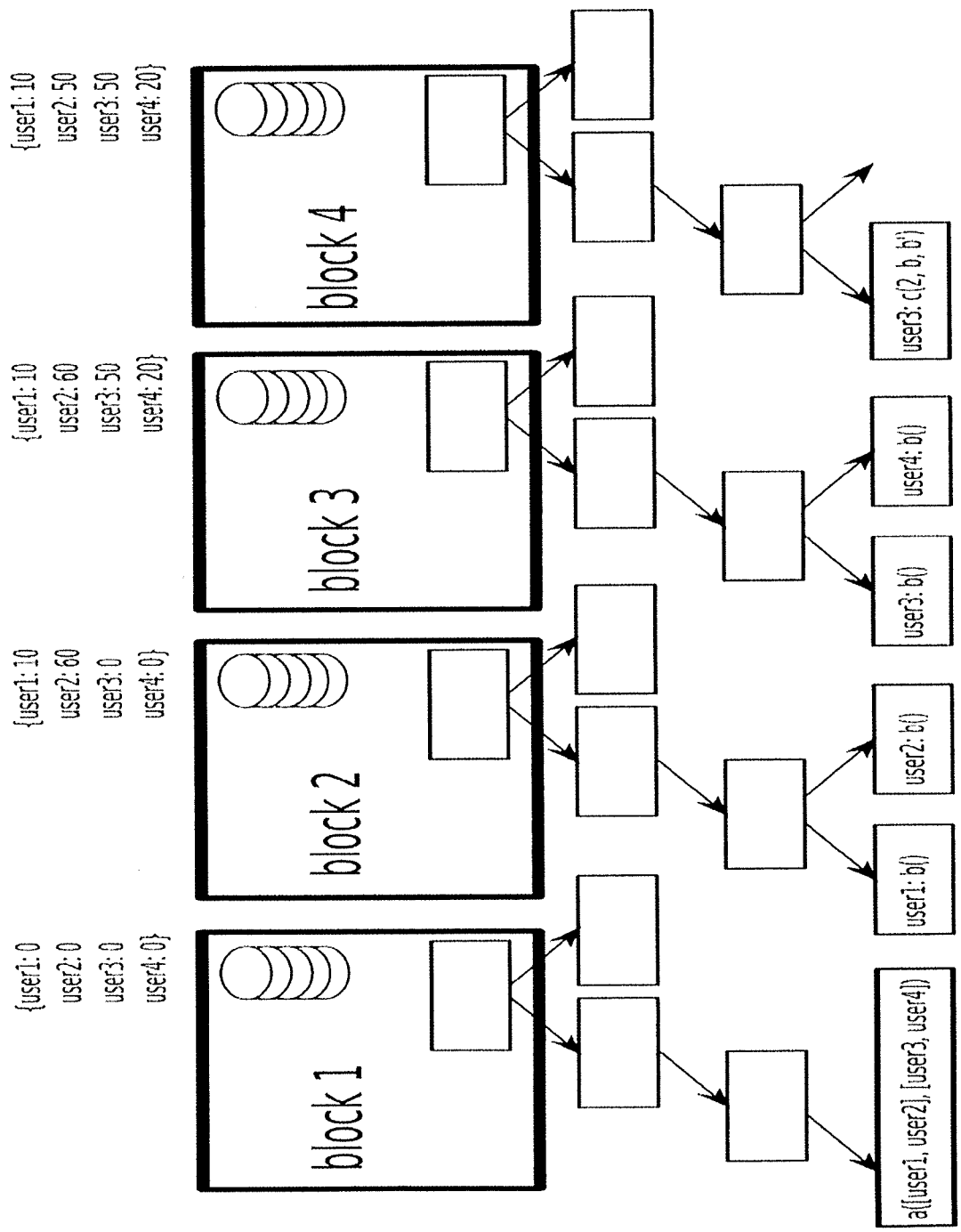
FIG. 3 illustrates one example of the correction of a smart contract recorded in a block chain according to one embodiment of the present invention.
Figure 4:
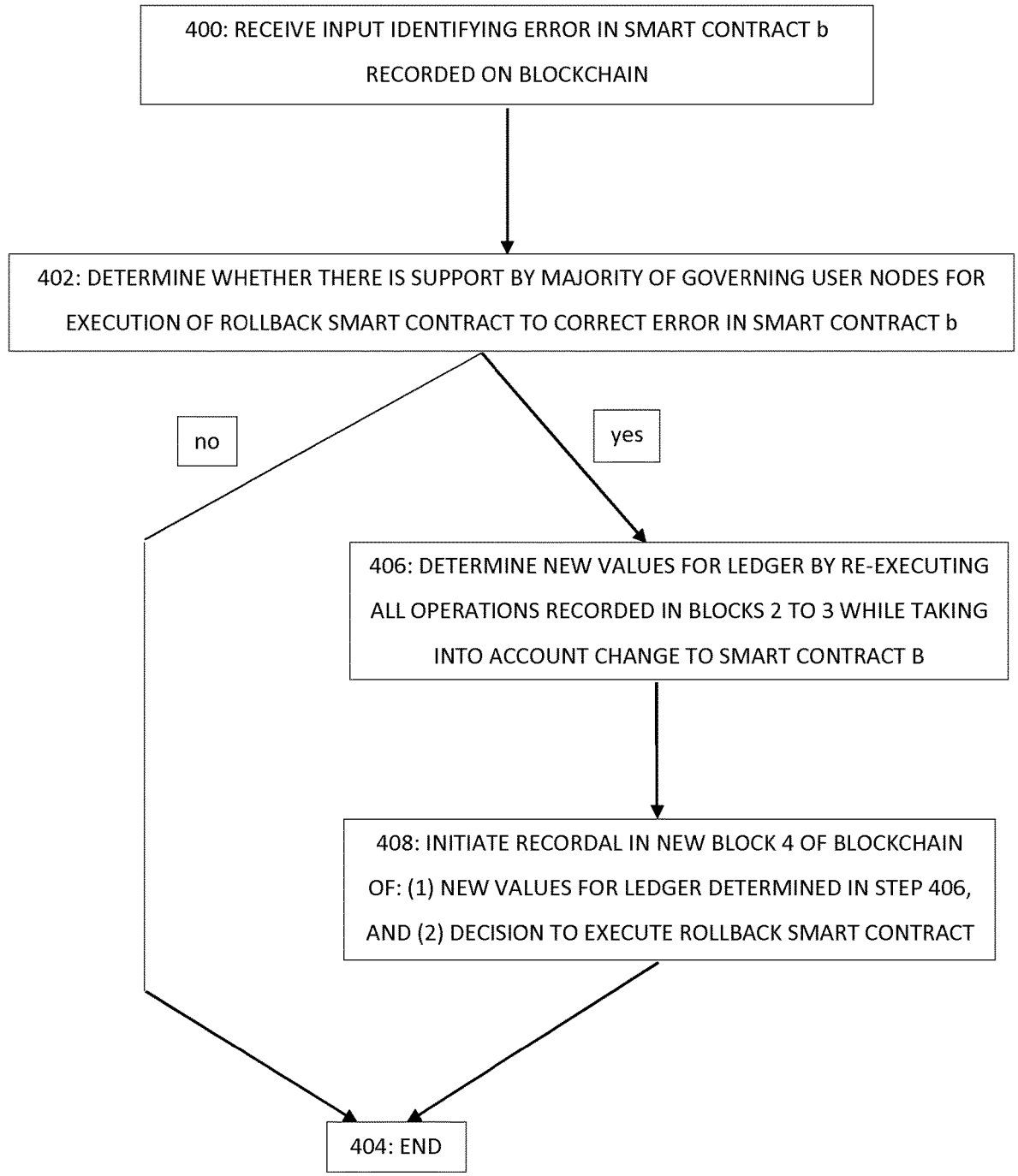
FIG. 4 illustrates one example of a set of operations according to one embodiment of the present invention, for the example of FIG. 3.

Part of an example of a permissioned block chain is shown in FIG. 3, and an example of a set of operations at a processor 4 of a node forming part of the group of nodes operating the blockchain is illustrated in FIG. 4.

Any method of achieving consensus about adding blocks to the blockchain of FIG. 3 may be employed. For example, the addition of blocks to the blockchain may be ruled by a proof-of-stake consensus algorithm, a proof-of-work consensus algorithm, or a majority-vote consensus algorithm.

In the example of FIG. 4, a processor 4, operating in accordance with a first smart contract "a" recorded in one or more blocks on the blockchain, adds Users 1 to 4 to a list of users of the blockchain, and records this operation in Block 1. The smart contract "a" specifies Users 1 and 2 to be non-governing users and users 3 and 4 to be governing users; the difference between governing users and non-governing users, and how the status of Users 1 to 4 may change, is discussed below.

Subsequently, a processor 4 at the same node or another node of the group of nodes, operating in accordance with a second smart contract "b" recorded in one or more blocks of the blockchain, determines tax payments for Users 1 and 2 of respective amounts based on data recorded for those users and tax rules encoded in smart contract "b", and records an update of the tax payment record for Users 1 and 2 in Block 2 of the blockchain.

Subsequently, a processor 4 at the same node or another node of the group of nodes, again operating in accordance with smart contract b recorded in one or more blocks of the blockchain, determines amounts of tax payments for Users 3 and 4, again based on data recorded for those users and tax rules encoded in the smart contract b; and records an update of the tax payment record for Users 3 and 4 in Block 3 of the blockchain.

After Block 3 of the blockchain, a processor 4 at a governing node receives an input indicating an error in smart contract "b" (e.g. a bug in the code of smart contract b) (STEP 400 of FIG. 4). In this example, the smart contract "b" failed to include code specifying an upper limit of 50 for any single tax payment. The smart contract "a" allows a governing node (User 3 or User 4) processor 4 to call a vote among a specified group of nodes (e.g. governing users only) about executing a rollback smart contract "c" that permits changes to the smart contract "b" (subject to one or more predetermined conditions) and dictates recordal in anew block of the blockchain of corrections to the latest record of tax payments for one or more users, taking into account the error in smart contract "b".

The governing node processor 4 determines whether there is support for calling a rollback smart contract "c" by a predetermined threshold number (e.g. majority) of governing nodes (STEP 402 of FIG. 4). Governing nodes are identifiable to each other by means of respective pairs of cryptographic key pairs shared between each pair of governing nodes.

If the result of this determination is positive, the governing user processor 4 executes the rollback smart contract "c". The processor 4 takes the tax payment values recorded in the block (Block 1 in the example of FIG. 3) immediately preceding the first block recording an operation according to the erroneous smart contract b (Block 2 in the example of FIG. 3), and determines new tax payment values for all users by applying to those tax payment values from Block 1 all the smart contracts for which operations/transactions are recorded in all subsequent blocks (i.e. Blocks 2 and 3 in the example of FIG. 3), but taking into account the correction to smart contract b (STEP 406 of FIG. 4).

The governing node processor 4 records the new tax payment values for all users in a new block (Block 4 in the example of FIG. 3) at the current end block of the chain including the first block recording an operation according to erroneous smart contract b (Block 2 in this example), together with a record of the vote to execute rollback smart contract c (STEP 408 of FIG. 4). In the example of FIG. 3, only the tax payment value for User 2 was affected by the error in smart contract b), and the determined new ledger values recorded in Block 4 happen to be the same as those recorded in Block 3, for all users except User 2. In other examples, a correction to a smart contract may lead to new ledger values which are different from the old ledger values for more than one user.

The roll-back process thereby comes to an end (STEP 404 of FIG. 4). Similarly, if the determination in STEP 402 is that there is not the necessary level of support (specified in smart contract a) for execution of the rollback smart contract c, the rollback process comes to an end (STEP 404) without any change to smart contract b.

No provenance is destroyed in applying this fix, retrospectively; the blockchain continues to provide a complete record of the history by which the currently recorded tax payments were calculated, without any change to any existing block of the blockchain. The correctness of the tax record for each user can be verified by any processor 4 scanning through the blocks of the blockchain. A processor 4 tasked with checking the tax record for User 2 will see a full record of how the existing tax record for User 2 is calculated, including execution of the faulty smart contract b and execution of the rollback smart contract c. This technique can be executed very quickly and does not require any new re-computation (mining) of existing blocks (e.g. Blocks 2 and 3 in this simple example) with e.g. any required mathematical links between successive blocks. The technique does involve the computation of anew block (e.g. Block 4 in the example of FIG. 3) for the blockchain with e.g. any necessary mathematical relationship to the previous block (Block 3 in the example of FIG. 3), but the computation resources for the addition of this new block are considerably less than the computation resources that would be required to re-compute previous blocks, particularly if there are a large number of blocks in the chain between the first block recording an operation according to the faulty smart contract band the most recent block. This is true regardless of the type of consensus algorithm by which blocks are added to the blockchain, e.g. regardless of whether the consensus algorithm is a proof-of-work algorithm, a proof-of-stake algorithm, or a majority-voting algorithm.

It is a feature of blockchain technology that a node of the blockchain network may (at least temporarily) maintain a local record of parallel sub-chains extending from the same block of the blockchain until one sub-chain is concluded to be more trustworthy than the other(s); and one option is to configure nodes of the blockchain network to work on adding new blocks to the longest sub-chain, on the basis that the longest sub-chain can be considered to be the most trustworthy. With the above-described technique, the blockchain may record a smart contract that configures nodes of the blockchain network to treat the sub-chain recording the most rollbacks as the most trustworthy sub-chain, on the basis that rollbacks can only be activated by governing users.

In one embodiment, any rollback contract may not itself be the subject of any later rollback contract. In one example, such a restriction may form part of the rollback smart contract itself (in a system where rollback smart contracts can only be added by a governing user). In another example, the one or more smart contracts configuring the general operation of the nodes of the blockchain network (which may be recorded in a genesis block of the blockchain, and are hereafter referred to as genesis smart contracts) may specify that any and all roll-back contracts activated by governing users may not themselves be the subject of a later rollback contract. The one or more genesis smart contracts may also specify that none of those smart contracts may be the subject of a roll-back contract. This prevents confusing collisions occurring when a rollback contract is executed; and in particular, prevents the malicious or accidental rollback of the genesis smart contract permitting the activation of rollback smart contracts by governing users.

In the example described above, the one or more genesis smart contracts require execution of a rollback smart contract to be initiated by a governing user and supported by a majority of governing users. In one variation, the one or more genesis smart contracts permit initiation of a vote about executing a rollback smart contract by any existing node of the blockchain network, or by any one of a pre-defined different subset of nodes.

As mentioned above, the vote on executing a rollback smart contract is implemented using respective cryptographic key pairs shared between each pair of governing nodes. In one embodiment, the one or more genesis smart contracts specify a lifetime for any cryptographic key pair, i.e. specify the length of time for which a cryptographic key pair is valid. In one embodiment, the one or more genesis smart contracts specify the election of a new governing node (by majority vote of all non-governing nodes of the blockchain network) in response to expiry of the cryptographic key pairs associated with a governing node. The one or more genesis smart contracts control the generation at one or more processors 4 of new cryptographic key pairs for any newly elected governing node.

In one embodiment, the one or more genesis smart contracts permit any non-governing node to call for invalidation of the cryptographic key pairs associated with a governing node (even before expiry of the normal lifetime of those cryptographic key pairs), subject to support by a majority of all existing non-governing nodes. For example, a processor 4 at a non-governing node may initiate a vote about invalidating the cryptographic key pairs associated with a governing node, in response to identifying a pattern of corrupt behaviour by the governing node (e.g. one or more operations by the node not in accordance with the smart contracts recorded on the blockchain), and/or in response to a user input.

In one embodiment, the genesis smart contracts provide for governing users to have two types of cryptographic key pairs: (i) an ordinary user key pair, and (ii) a governing user key pair, by which the governing user node participates in decisions about the execution of rollback smart contracts etc. An ordinary user key pair refers to a key pair used for authentication when recording personal tax information (e.g. income details) about a user on the blockchain, wherein the most recent update on the blockchain of any personal tax information for a user is used by a processor calculating a user tax payment in accordance with a smart contract recorded on the block chain. The ordinary key pair serves to verify that a node attempting to record tax information for a user on the block chain has the right/permission to do so.

Both governing users and non-governing users each have an ordinary user key pair for this purpose; and, as mentioned above, governing users have an additional governing user key pair for participating in governing decisions. This separation (in terms of key pairs) between the actions of a user as a governing user and the actions of the same user other than as a governing user (i.e. the provision of both ordinary and governing user key pairs for governing users) prevents the actions/data of a governing user being connected with, or in any way identifiable as related to, the actions/data of the same governing user in an ordinary capacity, such as actions involving recording personal information related to their personal tax account on the block chain.

In another embodiment, the tax records for all users are openly recorded in the block chain in a form in which they may be read by any other user, and each user (including governing users) has only one key pair. The record for each user on the block chain includes a field of data that identifies the user's current status as either an ordinary or governing user, and the field of data may be updated to reflect any change in the status of the user over time. Requests for voting on decisions, such as e.g. the execution of rollback smart contracts, are addressed to all users that are indicated by this data field to currently have governing status. There is no need for a smart contract to control the issue of new key pairs when there is a change in the status of a user; instead a processor 4 controls the addition to the blockchain of a new block indicating an update to the above-mentioned status data field for the user; the current status for any user can be identified from the most recent block including status information for the user.

Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:

1. A method, comprising:
receiving, at a node forming part of a group of nodes operating a distributed ledger network comprising a blockchain, an input regarding information of a first smart contract using at least one network interface of the node;
identifying, at the node forming part of the group of nodes operating the distributed ledger network comprising the blockchain, a decision to update at least one previously recorded term of a first smart contract after the first smart contract has been recorded in the blockchain;
executing a rollback smart contract that permits changes to the at least one previously recorded term identified for updating of the first smart contract, wherein the executing comprises applying the rollback smart contract to at least one value recorded in a block immediately preceding a first block recording an operation based on the first smart contract; and
updating a ledger of the distributed ledger network, using the at least one network interface of the node, with adding to a current end of the blockchain a new block indicating a new state of the ledger, as determined with the executing of the rollback smart contract, without changing any existing blocks of the blockchain.

2. A method according to claim 1, comprising including in said new block a reference to said decision to update said first smart contract.

3. A method according to claim 1, wherein said group of nodes operating said distributed ledger comprises at least two classes of node: a first class of node provided with one or more cryptographic key pairs for voting on decisions to change a smart contract recorded in the blockchain; and a second class of node without one or more cryptographic key pairs for voting on decisions to change a smart contract recorded in the blockchain.

4. A method according to claim 3, wherein said updating the ledger is dependent on the node identifying, using said cryptographic key pairs, that said decision to update the at least one previously recorded term of said first smart contract is supported with at least a predetermined threshold number of said first class of nodes.

5. A method according to claim 3, comprising: in the event of a split in the block chain, giving priority to extending the chain of blocks based on a highest number of first class nodes that support a type of smart contract changes, the highest number meeting or exceeding at least a predetermined threshold number of said first class nodes.

6. A method according to claim 3, wherein said blockchain records a smart contract according to which one or more of said nodes are configured to remove a node from said first class of nodes, in response to one or more predetermined conditions being met.

7. A method according to claim 6, wherein said one or more predetermined conditions include support with a predetermined number of said nodes.

8. A method according to claim 1, wherein said distributed ledger records payment of taxes.

9. An apparatus comprising:
at least one processor; and
at least one non-transitory memory storing instructions that, when executed by the at least one processor, cause the apparatus at least to:
receive, at a node forming part of a group of nodes operating a distributed ledger network comprising a blockchain, an input regarding information of a first smart contract using at least one network interface of the node;
identify, at the node forming part of the group of nodes operating the distributed ledger network comprising the blockchain, a decision to update at least one previously recorded term of a first smart contract after the first smart contract has been recorded in the blockchain;

execute a rollback smart contract that permits changes to the at least one previously recorded term identified for updating of the first smart contract, wherein the executing comprises applying the rollback smart contract to at least one value recorded in a block immediately preceding a first block recording an operation based on the first smart contract; and update a ledger of the distributed ledger network, using the at least one network interface of the node, with adding to a current end of the blockchain a new block indicating a new state of the ledger, as determined with the executing of the rollback smart contract, without changing any existing blocks of the blockchain.

10. An apparatus according to claim 9, wherein the instructions, when executed by the at least one processor, cause the apparatus at least to: include in said new block a reference to said decision to update said first smart contract.

11. An apparatus according to claim 9, wherein said group of nodes operating said distributed ledger comprises at least two classes of node: a first class of node provided with one or more cryptographic key pairs for voting on decisions to change a smart contract recorded in the blockchain; and a second class of node without one or more cryptographic key pairs for voting on decisions to change a smart contract recorded in the blockchain.

12. An apparatus according to claim 11, wherein the instructions, when executed by the at least one processor, cause the apparatus at least to: update the ledger dependent on identifying, using said cryptographic key pairs, that said decision to update the at least one previously recorded term of said first smart contract is supported with at least a predetermined threshold number of said first class of nodes.

13. An apparatus according to claim 11, wherein the instructions, when executed by the at least one processor, cause the apparatus at least to: in the event of a split in the block chain, give priority to extending the chain of blocks based on a highest number of first class nodes that support a type of smart contract changes, the highest number meeting or exceeding at least a predetermined threshold number of said first class nodes.

14. An apparatus according to claim 11, wherein said blockchain records a smart contract according to which one or more of said nodes are configured to remove a node from said first class of nodes, in response to one or more predetermined conditions being met.

15. An apparatus according to claim 14, wherein said one or more predetermined conditions include support with a predetermined number of said nodes.

16. An apparatus according to claim 9, wherein said distributed ledger records payment of taxes.

17. A non-transitory computer readable medium having stored thereon a set of computer readable instructions that, when executed with at least one processor, cause an apparatus to:

receive, at a node forming part of a group of nodes operating a distributed ledger network comprising a blockchain, an input regarding information of a first smart contract using at least one network interface of the node;

identify, at the node forming part of the group of nodes operating the distributed ledger network comprising the blockchain, a decision to update at least one previously recorded term of a first smart contract after the first smart contract has been recorded in the blockchain;

execute a rollback smart contract that permits changes to the at least one previously recorded term identified for updating of the first smart contract, wherein the executing comprises applying the rollback smart contract to at least one value recorded in a block immediately preceding a first block recording an operation based on the first smart contract; and update a ledger of the distributed ledger network, using the at least one network interface of the node, with adding to a current end of the blockchain a new block indicating a new state of the ledger, as determined with the executing of the rollback smart contract, without changing any existing blocks of the blockchain.

18. The method of claim 1, wherein the received input identifies an error in the first smart contract, the error related to the at least one previously recorded term of the first smart contract;

wherein the decision to update the at least one previously recorded term of the first contract is a result of a decision to correct the error related to the at least one previously recorded term of the first smart contract;

wherein the update to the at least one previously recorded term of the first smart contract corrects the identified error in the first smart contract with updating the at least one previously recorded term of the first smart contract to a different term.

* * * * *